United States Patent
Hayashi et al.

(10) Patent No.: US 10,382,188 B2
(45) Date of Patent: Aug. 13, 2019

(54) COMMUNICATION SYSTEM, COMMUNICATION DEVICE, AND COMMUNICATION METHOD

(71) Applicant: Mitsubishi Electric Corporation, Chiyoda-ku (JP)

(72) Inventors: Yuma Hayashi, Tokyo (JP); Daisuke Osagawa, Tokyo (JP); Kazuya Inazuma, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/740,068

(22) PCT Filed: Jan. 21, 2016

(86) PCT No.: PCT/JP2016/051691
§ 371 (c)(1),
(2) Date: Dec. 27, 2017

(87) PCT Pub. No.: WO2017/126077
PCT Pub. Date: Jul. 27, 2017

(65) Prior Publication Data
US 2018/0191484 A1 Jul. 5, 2018

(51) Int. Cl.
*H04L 7/00* (2006.01)
*G06F 13/40* (2006.01)
(Continued)

(52) U.S. Cl.
CPC ............ *H04L 7/0016* (2013.01); *G06F 13/40* (2013.01); *H04J 3/0658* (2013.01); *H04L 12/4035* (2013.01)

(58) Field of Classification Search
None
See application file for complete search history.

(56) References Cited

U.S. PATENT DOCUMENTS 9,742,820 B2 * 8/2017 Hughes ............ H04L 29/06027
9,894,606 B2 * 2/2018 Nammi ............ H04W 72/0446
(Continued)

FOREIGN PATENT DOCUMENTS

CN 1852265 A 10/2006
JP 2005-217787 A 8/2005
(Continued)

OTHER PUBLICATIONS

Office Action dated Mar. 13, 2018 in German Patent Application No. 11 2016 002 783.4 with English translation citing document AO therein, 13 pages.
(Continued)

*Primary Examiner* — Steve R Young
(74) *Attorney, Agent, or Firm* — Oblon, McClelland, Maier & Neustadt, L.L.P.

(57) ABSTRACT

A communication system includes: a first communication device that transmits a plurality of frames at a transmission time interval shorter than a time required for transmitting a minimum frame; and a second communication device that performs timing synchronization with the first communication device on the basis of the plurality of frames when a reception time interval of the plurality of frames received is equal to the transmission time interval.

11 Claims, 7 Drawing Sheets

(51) Int. Cl.
*H04J 3/06* (2006.01)
*H04L 12/403* (2006.01)

(56) References Cited

U.S. PATENT DOCUMENTS

| | | |
|---|---|---|
| 2006/0120341 A1 | 6/2006 | Del Prado Pavon et al. |
| 2006/0153203 A1 | 7/2006 | Del Prado Pavon et al. |
| 2009/0003307 A1* | 1/2009 | Yang ............... H04W 56/00 370/350 |
| 2010/0250781 A1* | 9/2010 | Matsunaga ......... H04J 3/0685 709/248 |
| 2012/0026905 A1* | 2/2012 | Sugiyama .............. H04L 43/50 370/252 |
| 2014/0321438 A1* | 10/2014 | Park ................. H04W 56/002 370/336 |
| 2015/0341934 A1* | 11/2015 | Sorrentino ........... H04B 7/2656 370/329 |
| 2018/0242354 A1* | 8/2018 | Takeda ................ H04W 72/04 |

FOREIGN PATENT DOCUMENTS

| | | |
|---|---|---|
| JP | 2007-519294 A | 7/2007 |
| JP | 2009-218652 A | 9/2009 |
| JP | 2010-232845 A | 10/2010 |
| JP | 2012-23654 A | 2/2012 |
| JP | 2013-30892 A | 2/2013 |
| JP | 2014-235013 A | 12/2014 |
| WO | WO 2015/156729 A1 | 10/2015 |

OTHER PUBLICATIONS

Combined Chinese Office Action and Search Report dated Jul. 3, 2018 in Chinese Patent Application No. 201680043784.3 (with unedited computer generated English translation), citing document AO therein, 10 pages.

International Search Report dated Mar. 29, 2016 in PCT/JP2016/051691 filed Jan. 21, 2016.

Notification of Reason for Refusal dated Oct. 20, 2016 in JP 2016-544647 (with English Translation).

Notification of Reason for Refusal dated Mar. 2, 2017 in JP 2016-544647 (with English Translation).

Decision to Grant a Patent dated Jul. 6, 2017 in JP 2016-544647 (with English Translation).

* cited by examiner

COMMUNICATION SYSTEM, COMMUNICATION DEVICE, AND COMMUNICATION METHOD

FIELD

The present invention relates to a communication system performing timing synchronization, a communication device, and a communication method.

BACKGROUND

A system in which a plurality of devices network-connected operates in coordination with one another is required to match control timings of the devices by matching times measured by the devices. Matching the control timings of a number of devices with each other is called timing synchronization.

For example, in a system in which a material is cut while the material is carried, a desired part of the material is cut even while the material is currently carried when the timing at which one device carries the material matches the timing at which another device cuts the material.

However, a part different from the desired part of the material is adversely cut if the timing at which the one device carries the material does not match the timing at which the other device cuts the material.

In a system requiring timing synchronization, in general, a synchronization master device that is a master for the timing synchronization and a synchronization slave device that is a slave for the timing synchronization communicate with each other at a predetermined communication time interval. In this situation, the synchronization slave device performs timing synchronization with the synchronization master device.

However, the accuracy of timing synchronization is decreased in some cases where a transmission time interval of transmit data of the synchronization master device fluctuates. Fluctuation in the transmission time interval is caused by a failure of the synchronization master device or a disturbance from a device or devices other than the synchronization master device, for example.

As a related technique, Patent Literature 1 listed below discloses a time synchronization device including: a plurality of estimated time calculation units that calculates an estimated time of a corresponding time master device among a plurality of time master devices each transmitting a reference time indicating a time to be a reference, on the basis of the reference time transmitted from the corresponding time master device and a propagation delay time from the time master device; and a current time calculation unit that calculates a current time meaning a current time point on the basis of a number of estimated times calculated by the plurality of estimated time calculation units, wherein the estimated time calculation unit discards a reference time transmitted from the corresponding time master device when the reference time is received at a reception interval longer than or equal to a threshold value (claim 5).

CITATION LIST

Patent Literature

Patent Literature 1: Japanese Patent Application Laid-open No. 2014-235013

SUMMARY

Technical Problem

The system in which a number of devices are network-connected experiences a communication delay caused irregularly due to a collision between frames or an interrupt of another frame between two frames.

The time synchronization device described in Patent Literature 1 compares the reception interval of the reference time with a threshold value and discards the reference time with a long reception interval, due to which the occurrence of a collision between frames can be assumed, thereby improving the accuracy of synchronization.

However, since the time synchronization device described in Patent Literature 1 cannot detect a case where the collision between frames occurs at all times or a case where the increase in the reception interval caused by the collision between frames is minute, there has been a problem in that accuracy of timing synchronization is decreased.

The present invention has been made in view of the above circumstances, and an object of the invention is to provide a communication system capable of improving accuracy of timing synchronization.

Solution to Problem

In order to solve the aforementioned problem and achieve the object, the present invention provides a communication system comprising: a first communication device to transmit a plurality of frames at a transmission time interval shorter than a time required for transmitting a minimum frame; and a second communication device to perform timing synchronization with the first communication device on the basis of the plurality of frames when a reception time interval of the frames received is equal to the transmission time interval.

The second communication device can detect that the reception time interval of a number of frames received is shorter than the transmission time interval.

Advantageous Effects of Invention

The communication system according to the present invention can achieve improvement of the accuracy of timing synchronization.

DESCRIPTION OF EMBODIMENT

A communication system, a communication device, and a communication method according to an embodiment of the present invention will now be described in detail with reference to the drawings. Note that the present invention is not necessarily limited by the embodiment.

First Embodiment

Figure 1:
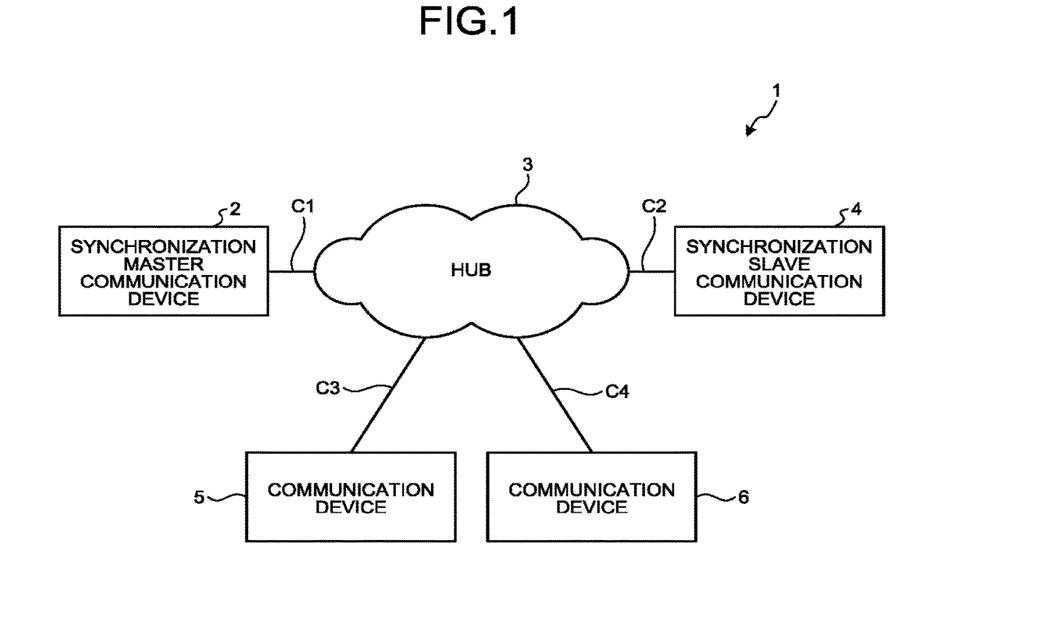
FIG. 1 is a diagram illustrating the configuration of a communication system according to a first embodiment.

FIG. 1 is a diagram illustrating the configuration of a communication system according to a first embodiment.

The communication system 1 includes a synchronization master communication device 2 that transmits two or more frames, a hub 3 that is connected to the synchronization master communication device 2 via a cable C1 and transfers the two or more frames received from the synchronization master communication device 2, and a synchronization slave communication device 4 that is connected to the hub via a cable C2, receives from the hub 3 the two or more frames transmitted from the synchronization master communication device 2, and performs timing synchronization with the synchronization master communication device 2 on the basis of the two or more frames.

The synchronization master communication device 2 corresponds to a first communication device of the present invention. The synchronization slave communication device 4 corresponds to a second communication device of the present invention.

The synchronization master communication device transmits to the hub 3 a frame in which a media access control (MAC) address of the synchronization slave communication device 4 is stored in a destination MAC address field of the frame.

The hub 3 refers to the MAC address stored in the destination MAC address field of the frame received from the synchronization master communication device 2 to determine that the destination of the frame is the synchronization slave communication device 4, and transfers the frame received from the synchronization master communication device 2 to the synchronization slave communication device 4.

The communication system 1 further includes a communication device 5 connected to the hub 3 via a cable C3 and a communication device 6 connected to the hub 3 via a cable C4.

The communication device 5 transmits to the hub 3 a frame in which a MAC address of the communication device 6 is stored in a destination MAC address field of the frame.

The hub 3 refers to the MAC address stored in the destination MAC address field of the frame received from the communication device 5 to determine that the destination of the frame is the communication device 6, and transfers the frame received from the communication device 5 to the communication device 6.

Figure 2:
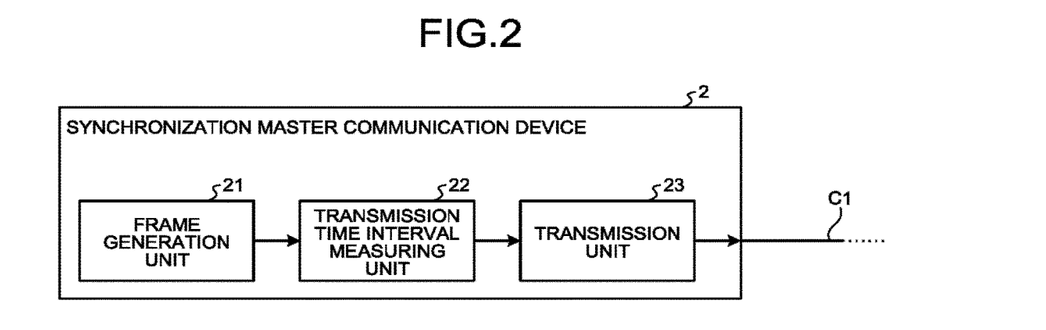
FIG. 2 is a diagram illustrating functional blocks of a synchronization master communication device of the communication system according to the first embodiment.

FIG. 2 is a diagram illustrating functional blocks of the synchronization master communication device of the communication system according to the first embodiment.

The synchronization master communication device 2 includes a frame generation unit 21 that generates a plurality of frames, a transmission time interval measuring unit 22 that measures a transmission time interval between the frames, and a transmission unit 23 that transmits the frames to the synchronization slave communication device 4 at a transmission time interval shorter than the time required for transmitting a minimum frame.

The minimum frame and the time required for transmitting the minimum frame will be described later.

The transmission time interval is a time interval between a timing at which transmission of one frame is completed and a timing at which transmission of a subsequent frame is started.

Figure 3:
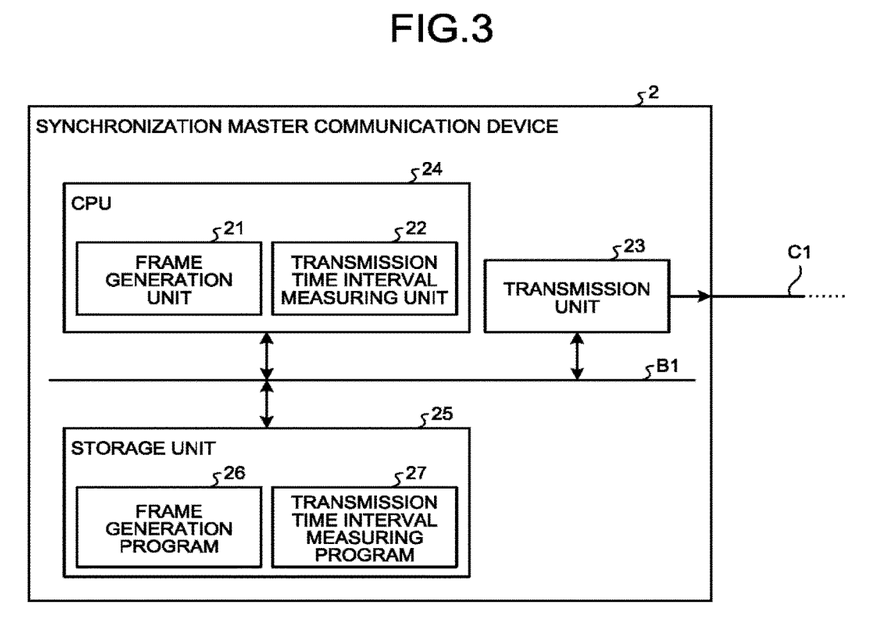
FIG. 3 is a diagram illustrating the hardware configuration of the synchronization master communication device of the communication system according to the first embodiment.

FIG. 3 is a diagram illustrating the hardware configuration of the synchronization master communication device of the communication system according to the first embodiment.

The synchronization master communication device 2 includes the transmission unit 23, a central processing unit (CPU) 24, and a storage unit 25. The transmission unit 23, the CPU 24, and the storage unit 25 are connected to each other via a bus B1.

The storage unit 25 stores a frame generation program 26 and a transmission time interval measuring program 27. The storage unit 25 can be a flash memory (registered trademark), for example.

The frame generation program 26 is a program for generating a plurality of frames. The CPU 24 executes the frame generation program 26 to implement the frame generation unit 21 that generates a plurality of frames.

The frame generation unit 21 generates a plurality of frames such that the transmission time interval between the frames is shorter than the time required for transmitting the minimum frame.

The transmission time interval measuring program 27 is a program for measuring the transmission time interval between the frames. The CPU 24 executes the transmission time interval measuring program 27 to implement the transmission time interval measuring unit 22 that measures the transmission time interval between the frames.

The transmission unit 23 is a physical layer circuit serving as a physical layer that is a first layer for an OSI reference model (Open Systems Interconnection reference model, ISO (International Organization for Standardization/IEC (International Electrotechnical Commission) 7498).

For a physical layer for communication, use is made of Ethernet (registered trademark; IEEE (The Institute of Electrical and Electronics Engineers, Inc.) 802.3), for example.

The transmission unit 23 is connected to the hub 3 via the cable C1.

The transmission unit 23 transmits two or more frames to the synchronization slave communication device 4 at the transmission time interval shorter than the time required for transmitting the minimum frame.

In the first embodiment, the physical layer of communication has the following features.

First, the physical layer of communication can be branched. For example, in addition to a first device and a second device communicating with the first device, a third device can be connected to the physical layer of communication.

Secondly, while one communication is carried out, another communication is kept on standby. While the communication between the first device and the second device is carried out, for example, the communication between the third device and a fourth device is kept on standby.

Thirdly, the time required for transmitting the minimum frame can be defined. The minimum frame is a frame whose frame length is minimal. The minimum frame has a length of 64 bytes in Ethernet (registered trademark). Accordingly, for Ethernet (registered trademark), the time required for transmitting the minimum frame can be defined by a value that is obtained by dividing 64 bytes by a communication bit rate. The communication bit rate can be 100 M bits per second (bps) or 1000 Mbps, for example.

Ethernet (registered trademark) is an example of the physical layer for communication, and thus a frame length of the minimum frame is not limited to 64 bytes.

Fourthly, a communication delay is constant under a condition where no frame collision occurs. No frame collision occurs when communication is not established between the third device and the fourth device while communication is carried out between the first device and the second device, for example. In the case of no occurrence of frame collision, a communication delay between the first device and the second device is constant.

Figure 4:
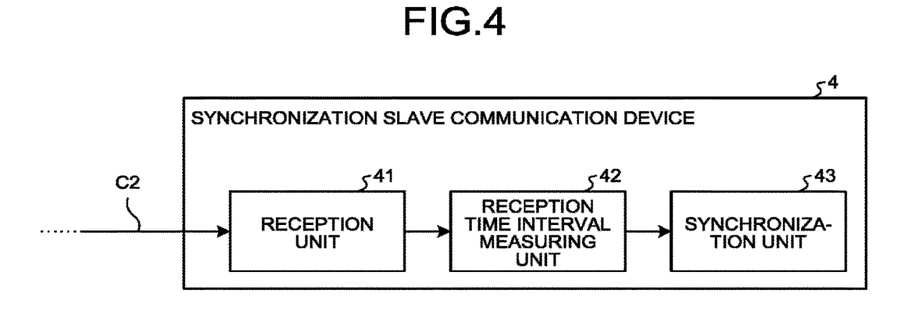
FIG. 4 is a diagram illustrating functional blocks of a synchronization slave communication device of the communication system according to the first embodiment.

FIG. 4 is a diagram illustrating functional blocks of the synchronization slave communication device of the communication system according to the first embodiment.

The synchronization slave communication device 4 includes a reception unit 41 that receives a plurality of frames, a reception time interval measuring unit 42 that measures a reception time interval between the plurality of frames, and a synchronization unit 43 that performs timing synchronization with the synchronization master communication device 2 on the basis of the frames when the reception time interval is equal to the transmission time interval.

The reception time interval is a time interval between a timing at which reception of one frame is completed and a timing at which reception of a subsequent frame is started.

Figure 5:
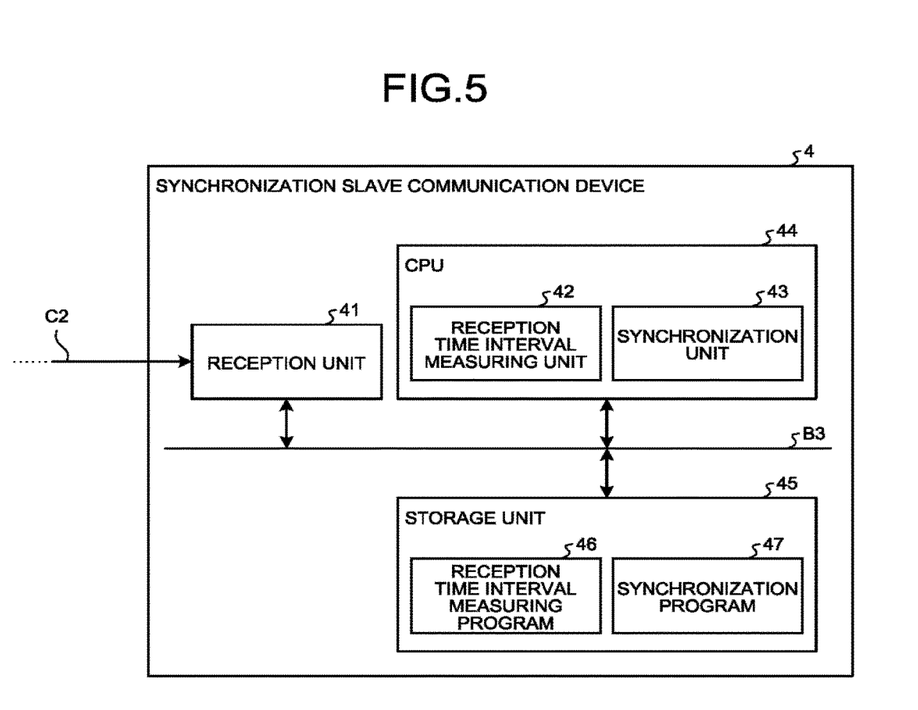
FIG. 5 is a diagram illustrating the hardware configuration of the synchronization slave communication device of the communication system according to the first embodiment.

FIG. 5 is a diagram illustrating the hardware configuration of the synchronization slave communication device of the communication system according to the first embodiment.

The synchronization slave communication device 4 includes the reception unit 41, a CPU 44, and a storage unit 45. The reception unit 41, the CPU 44, and the storage unit 45 are connected to each other via a bus 53.

The reception unit 41 is a physical layer circuit serving as a physical layer that is the first layer of the OSI reference model. The reception unit 41 is connected to the hub 3 via the cable C2.

The storage unit 45 stores a reception time interval measuring program 46 and a synchronization program 47. The storage unit 45 can be a flash memory (registered trademark), for example.

The reception time interval measuring program 46 is a program for measuring the reception time interval between the frames.

The CPU 44 executes the reception time interval measuring program 46 to implement the reception time interval measuring unit 42 that measures the reception time interval between the frames.

The synchronization program 47 is a program for performing timing synchronization with the synchronization master communication device 2 on the basis of the frames when the reception time interval is equal to the transmission time interval.

The CPU 44 executes the synchronization program 47 to implement the synchronization unit 43 that performs timing synchronization with the synchronization master communication device 2 on the basis of the frames when the reception time interval is equal to the transmission time interval.

Next, the operation of the communication system 1 according to the first embodiment will be described.

Figure 6:
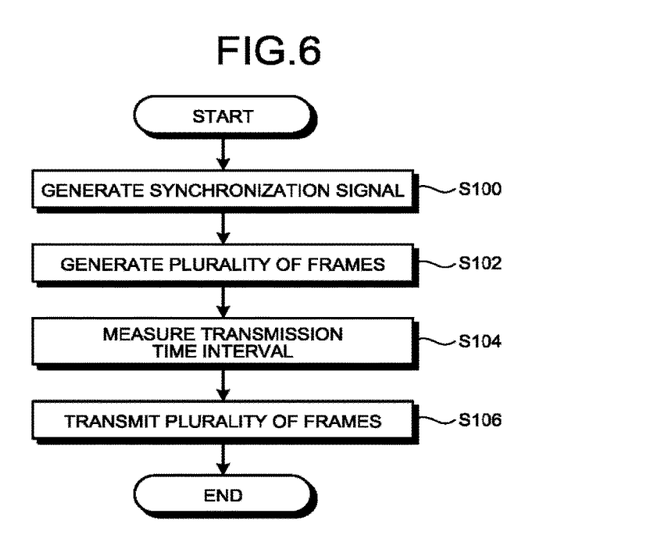
FIG. 6 is a flowchart illustrating processing of the synchronization master communication device of the communication system according to the first embodiment.

FIG. 6 is a flowchart illustrating processing of the synchronization master communication device of the communication system according to the first embodiment. Upon receiving a request to start timing synchronization, the synchronization master communication device 2 starts the processing illustrated in FIG. 6.

In step S100, the frame generation unit 21 generates a synchronization signal for timing synchronization. The synchronization signal can be a signal of a reference time of the synchronization master communication device 2, on which timing synchronization is based, for example. The synchronization slave communication device 4 can perform timing synchronization by setting a time obtained by adding a communication delay time to the synchronization signal, as a timing at which a frame is received from the synchronization master communication device 2.

In step S102, the frame generation unit 21 generates a plurality of frames F1 and F2. The frame generation unit 21 generates the frame F1 and the frame F2 such that the transmission time interval between the frames F1 and F2 is shorter than the time required for transmitting the minimum frame in the physical layer of communication.

Figure 7:
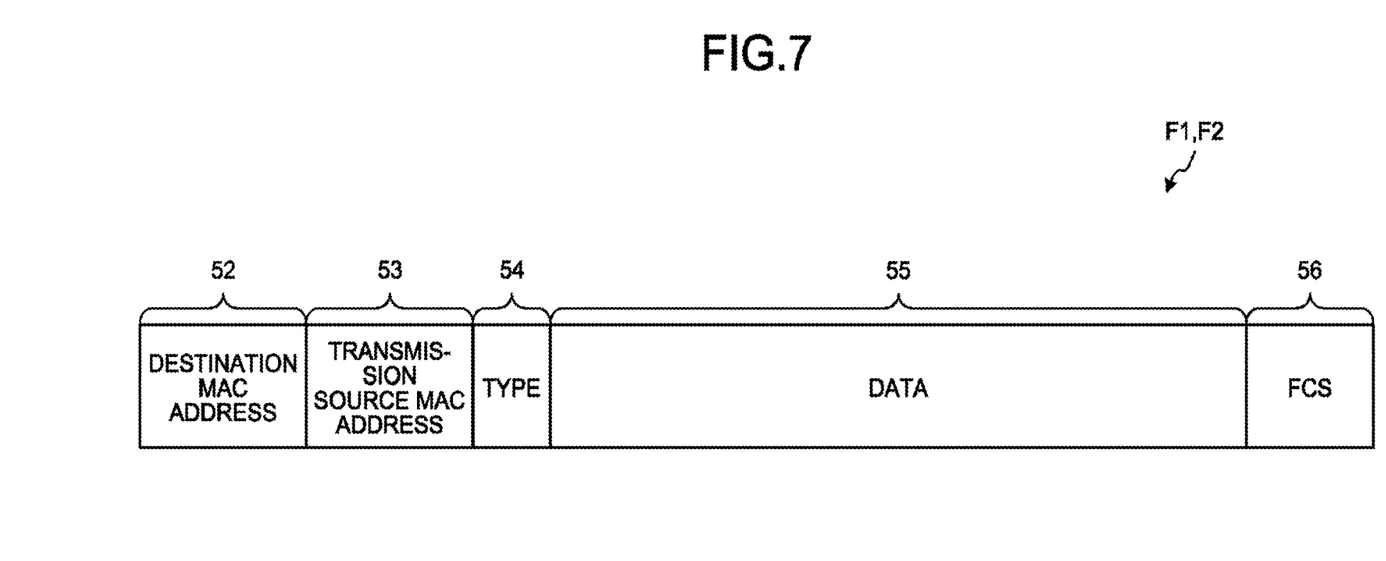
FIG. 7 is a chart illustrating a format of a frame transmitted and received in the communication system according to the first embodiment.

FIG. 7 is a chart illustrating a format of a frame transmitted and received in the communication system according to the first embodiment.

Each of the frame F1 and the frame F2 includes a destination MAC address field 52, a transmission source MAC address field 53, a type field 54, a data field 55, and a frame check sequence (FCS) field 56.

The destination MAC address field 52 is six bytes long, and stores the MAC address of the synchronization slave communication device 4.

The source MAC address field 53 is six bytes long, and stores a MAC address of the synchronization master communication device 2.

The type field 54 stores a bit string specifying a protocol of a layer higher an the physical layer of communication.

The data field 55 has a variable length from 46 bytes long to 1500 bytes long and stores data to be transmitted.

The frame generation unit stores the synchronization signal generated in step S100 into the data field 55 of the frame F1.

Note that the synchronization signal may be transmitted to the synchronization slave communication device 4 in advance before the synchronization master communication device 2 starts the processing illustrated in FIG. 6.

A transmission time interval T0 measured by the transmission time interval measuring unit 22 is stored in the data field 55 of the frame F2.

The FCS field 56 our bytes long, and stores a bit string for checking whether a transmission error occurs in the frame F1 or the frame F2. The FCS field 56 stores a cyclic redundancy check (CRC) calculated from the bit strings stored in the destination MAC address field 52, the transmission source MAC address field 53, the type field 54, and the data field 55.

Therefore, the frame length of each of the frame F1 and the frame F2 is 64 bytes at the minimum and 1518 bytes at the maximum.

Referring again to FIG. 6, in step S104, the transmission time interval measuring unit 22 measures the transmission time interval T0 between the frame F1 and the frame F2. The transmission time interval measuring unit 22 stores the measured transmission time interval T0 into the data field 55 of the frame F2.

In step S106, the transmission unit 23 transmits the frame F1 and the frame F2 at the transmission time interval T0, and then ends the processing.

Note that in the flowchart of FIG. 6, step S106 executed by the transmission unit 23 is described after step S104 executed by the transmission time interval measuring unit 22. In practice, however, the transmission time interval measuring unit 22 and the transmission unit 23 operate in parallel.

Therefore, the transmission time interval measuring unit 22 can measure the transmission time interval T0 between the frame F1 and the frame F2 by monitoring a transmission status of the frame F1 and the frame F2 of the transmission unit 23. The transmission time interval measuring unit 22 stores the measured transmission time interval T0 into the data field 55 of the frame F2.

Figure 8:
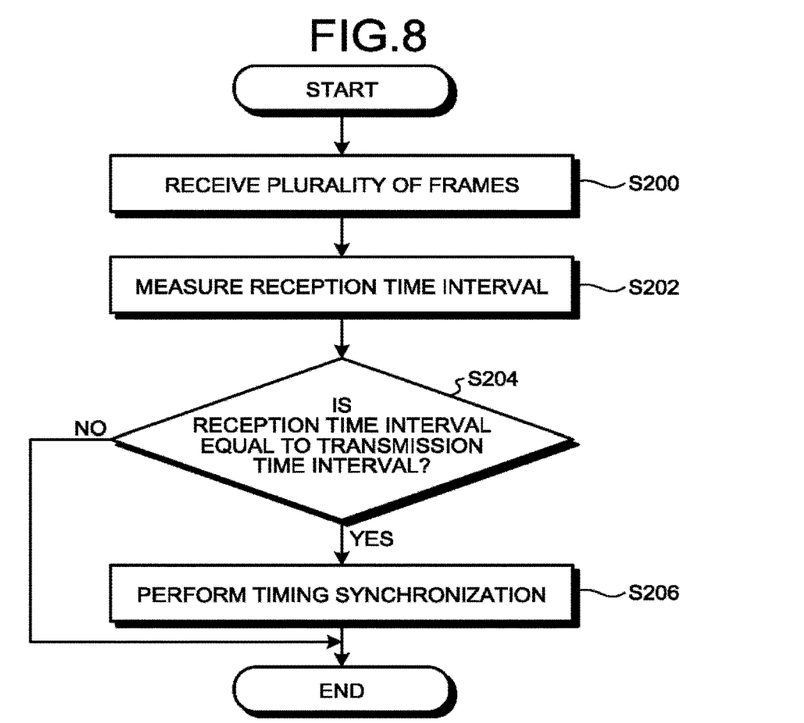
FIG. 8 is a flowchart illustrating processing of the synchronization slave communication device of the communication system according to the first embodiment.

FIG. 8 is a flowchart illustrating processing of the synchronization slave communication device of the communication system according to the first embodiment.

In step S200, the reception unit 41 receives the frame F1 and the frame F2 from the hub 3.

In step S202, the reception time interval measuring unit 42 measures a reception time interval between the frame F1 and the frame F2.

In step S204, the synchronization unit 43 determines whether or not the reception time interval T is equal to the transmission time interval T0 stored in the data field 55 of the frame F2. The synchronization unit 43 proceeds with the process to step S206 when determining that the reception time interval T is equal to the transmission time interval T0 (Yes in step S204). The synchronization unit 43 ends the processing when determining that the reception time interval T is not equal to the transmission time interval T0 (No in step S204).

In step S206, the synchronization unit 43 performs timing synchronization with the synchronization master communication device 2 on the basis of the frame F1 and the frame F2.

Figure 9:
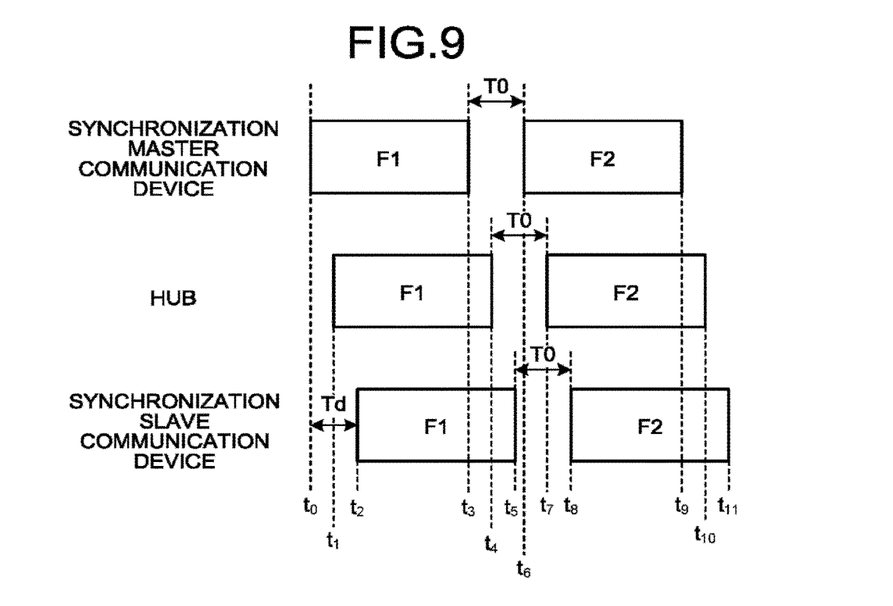
FIG. 9 is a chart illustrating a first timing example of communication performed in the communication system according to the first embodiment.

FIG. 9 is a chart illustrating a first timing example of communication performed in the communication system according to the first embodiment.

The synchronization master communication device 2 starts transmitting the frame F1 to the hub 3 at a timing $t_0$. Upon starting to receive the frame F1 from the synchronization master communication device 2, the hub 3 starts transferring the frame F1 to the synchronization slave communication device 4 at a timing $t_1$.

The synchronization slave communication device 4 starts receiving the frame F1 from the hub 3 at a timing $t_2$.

The synchronization master communication device 2 finishes transmitting the frame F1 to the hub 3 at a timing $t_3$. Upon finishing reception of the frame F1 from the synchronization master communication device 2, the hub finishes transferring the frame F1 to the synchronization slave curtication device 4 at a timing $t_4$.

The synchronization slave communication device 4 finishes receiving the frame F1 from the hub 3 at a timing $t_5$.

The synchronization master communication device 2 starts transmitting the frame F2 to the hub 3 at a timing $t_6$ after the lapse of the transmission time interval T0 from the timing $t_3$.

In the first embodiment, the transmission time interval T0 is shorter than the time required for transmitting the minimum frame.

Upon starting to receive the frame F2 from the synchronization master communication device 2, the hub 3 starts transferring the frame F2 to the synchronization slave communication device 4 at a timing $t_7$.

Since a delay in the network is constant when the communication device 5 or the communication device 6 does not transmit any frame and does not cause any collision with or interruption of the frame F1 and the frame F2, a time interval between the timing $t_4$ and the timing $t_7$ is equal to the transmission time interval T0.

The synchronization slave communication device 4 starts receiving the frame F2 from the hub 3 at a timing $t_8$.

Since a delay in the network is constant when the communication device 5 or the communication device 6 does not transmit any frame and does not cause any collision with or interruption of the frame F1 and the frame F2, the reception time interval T between the timing $t_5$ and the timing $t_0$ is equal to the transmission time interval T0.

The synchronization master communication device 2 finishes transmitting the frame F2 to the hub 3 at a timing $t_9$.

Upon finishing reception of the frame F2 from synchronization master communication device 2, the hub 3 finishes transferring the frame F2 to the synchronization slave communication device 4 at a timing $t_{10}$.

The synchronization slave communication device 4 finishes receiving the frame F2 from the hub 3 at a timing $t_{11}$.

In the first timing example, the synchronization unit 43 of the synchronization slave communication device 4 determines that the reception time interval T between the timing $t_5$ and the timing $t_8$ is equal to the transmission time interval T0 stored in the data field 55 of the frame F2, and performs timing synchronization on the basis of a communication delay time Td between the timing $t_0$ and the timing $t_2$ and the synchronization signal stored in the data field 55 of the frame F1.

Specifically, the synchronization unit 43 of the synchronization slave communication device 4 adds the communication delay time Td to the reference time that is carried by the synchronization signal stored in the data field 55 of the frame F1, and sets the resultant time obtained by the addition as the time of the synchronization slave communication device 4 at the timing In the first timing example, the communication device 5 or the communication device 6 does not transmit any frame and thus causes no collision with or interrupt of the frame F1 and the frame F2 during a period from the timing $t_0$ when the synchronization master communication device 2 starts transmitting the frame F1 to the timing $t_{11}$ when the synchronization slave communication device 4 finishes receiving the frame 52. As a result, the communication delay time Td between the timing to and the timing $t_2$ at which the synchronization slave communication device 4 starts receiving the frame F1 is constant.

Therefore, the synchronization slave communication device 4 can perform timing synchronization with high accuracy.

Figure 10:
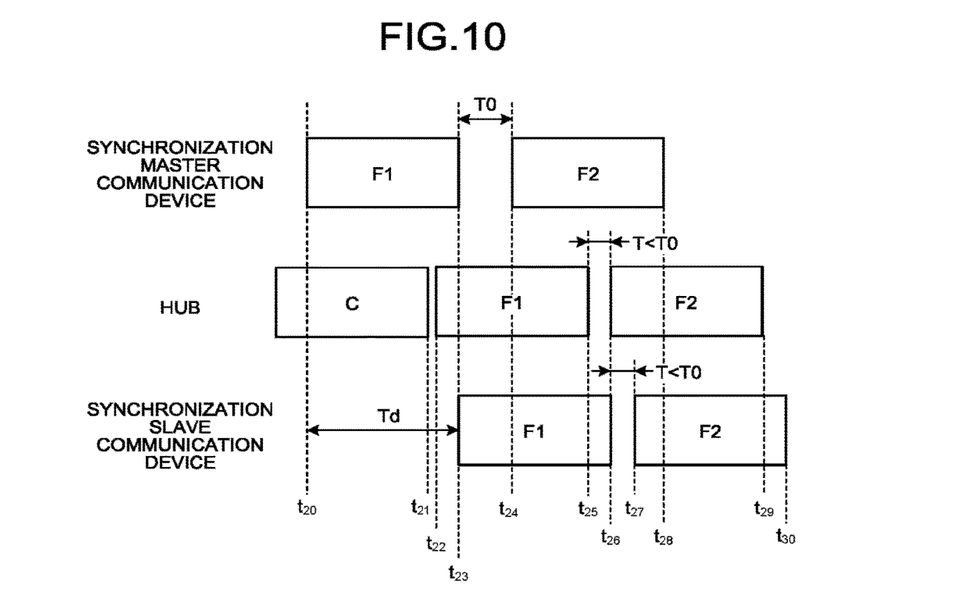
FIG. 10 is a chart illustrating a second timing example of communication performed in the communication system according to the first embodiment.

FIG. 10 is a chart illustrating a second timing example of communication performed in the communication system according to the first embodiment.

The synchronization master communication device 2 starts transmitting the frame F1 to the hub 3 at a timing $t_{20}$.

At the timing $t_{20}$, the hub 3 is in the process of transferring a frame C from the communication device 5 to the communication device 6. That is, a collision occurs between the frame C and the frame F1.

For this reason, the hub 3 is not allowed to start transferring the frame F1 to the synchronization slave communication device 4 at the timing $t_{20}$.

The hub 3 finishes transferring the frame C from the communication device 5 to the communication device 6 at a timing $t_{21}$.

The hub 3 starts transferring the frame F1 to the synchronization slave communication device 4 at a timing $t_{22}$.

The synchronization master communication device 2 finishes transmitting the frame F1 to the hub 3 at a timing $t_{23}$.

The synchronization slave communication device 4 starts receiving the frame F1 from the hub 3 at a timing $t_{23}$.

The synchronization master communication device 2 starts transmitting the frame F2 to the hub 3 at a timing $t_{24}$ after the lapse of the transmission time interval T0 from the timing $t_{23}$.

The hub 3 finishes transferring the frame F1 to the synchronization slave communication device 4 at timing $t_{25}$.

The synchronization slave communication device 4 finishes receiving the frame F1 from the hub 3 at a timing $t_{26}$.

The hub 3 starts receiving the frame F2 at the timing $t_{24}$ before the timing $t_{25}$ at which transfer of the frame F1 to the synchronization slave communication device 4 is finished. The hub 3 therefore starts transferring the frame F2 to the synchronization slave communication device 4 at a timing $t_{26}$.

The synchronization slave communication device 4 starts receiving the frame F2 from the hub 3 at a timing $t_{27}$.

Therefore, a transfer time interval T between the timing $t_{25}$ when the hub 3 finishes transferring the frame F1 and the timing $t_{26}$ when the hub 3 starts transferring the frame F2 is shorter than the transmission time interval T0. Likewise, a reception time interval T between the timing $t_{26}$ when the synchronization slave communication device 4 finishes receiving the frame F1 and the timing $t_{27}$ when the synchronization slave communication device 4 starts receiving the frame F2 is shorter than the transmission time interval T0.

The synchronization communication device 2 finishes transmitting the frame F2 to the hub 3 at a timing $t_{28}$.

The hub 3 finishes transferring the frame F2 to the synchronization slave communication device 4 at timing $t_{29}$.

The synchronization slave communication device 4 finishes receiving the frame F2 from the hub 3 at a timing $t_{30}$.

In the second timing example, the hub 3 is in the process of transferring the frame C from the communication device 5 to the communication device 6 at the timing $t_{20}$ at which the synchronization master communication device 2 starts transmitting the frame F1. As a result, a communication delay time Td between the timing $t_{20}$ and the timing $t_{23}$ at which the synchronization slave communication device 4 starts receiving the frame F1 is longer than the communication delay time Td in the first timing example illustrated in FIG. 9.

The influence of the hub 3 transferring the frame C from the communication device 5 to the communication device 6 at the timing $t_{20}$ is that the communication delay time Td becomes longer than that of the first timing example, and that the reception time interval T becomes shorter than that of the first timing example. Therefore, in the second timing example, the synchronization slave communication device 4 cannot perform timing synchronization with high accuracy.

So, in the second timing example, the synchronization slave communication device 4 can determine that timing synchronization cannot be performed with high accuracy by determining that the reception time interval T between the timing $t_{26}$ and the timing $t_{27}$ is not equal to the transmission time interval T0 stored in the data field 55 of the frame F2. Accordingly, in the second timing example, the synchronization slave communication device 4 does not perform timing synchronization.

Figure 11:
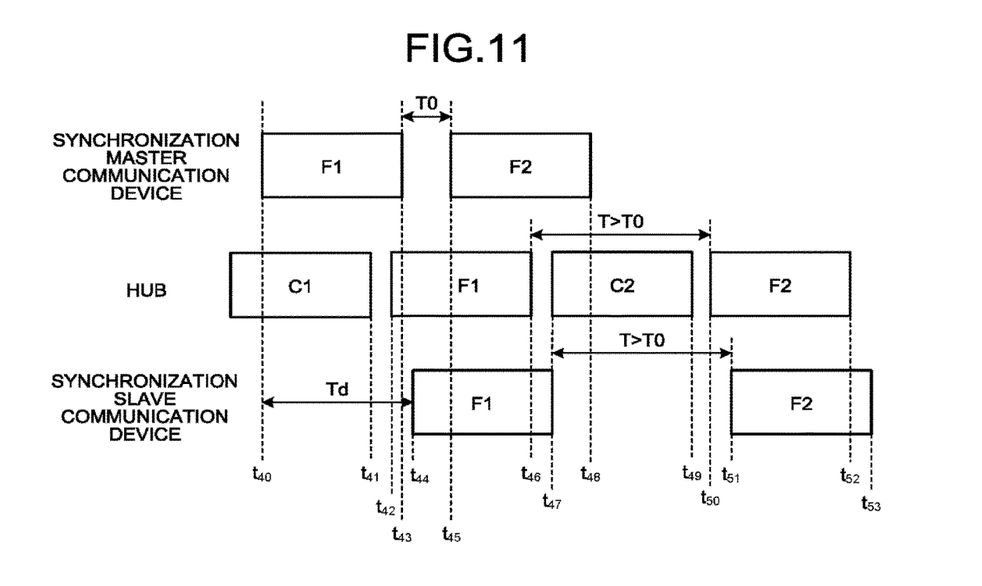
FIG. 11 is a chart illustrating a third timing example of communication performed in the communication system according to the first embodiment.

FIG. 11 is a chart illustrating a third timing example of communication performed in the communication system according to the first embodiment.

The synchronization master communication device 2 starts transmitting the frame F1 to the hub 3 at a timing $t_{40}$.

At the timing $t_{40}$, the hub 3 is in the process of transferring a frame C1 from the communication device 5 to the communication device 6. That is, a collision occurs between the frame C1 and the frame F1.

The hub 3 cannot therefore start transferring the frame F1 to the synchronization slave communication device 4 at the timing $t_{40}$.

The hub 3 finishes transferring the frame C1 from the communication device 5 to the communication device 6 at a timing $t_{41}$.

The hub 3 starts transferring the frame F1 to the synchronization slave communication device 4 at a timing $t_{42}$.

The synchronization master communication device 2 finishes transmitting the frame F1 to the hub 3 at a timing $t_{43}$.

The synchronization slave communication device 4 starts receiving the frame F1 from the hub 3 at a timing $t_{44}$.

The synchronization master communication device 2 starts transmitting the frame F2 to the hub 3 at a timing $t_{45}$ after the lapse of the transmission time interval T0 from the timing $t_{43}$.

The hub 3 finishes transferring the frame F1 to the synchronization slave communication device 4 at a timing $t_{46}$.

The synchronization slave communication device 4 finishes receiving the frame F1 from the hub 3 at a timing $t_{47}$.

At the timing $t_{47}$, the hub 3 starts transferring a frame C2 received from the communication device 5 to the communication device 6. That is, an interruption by the frame C2 is caused between the frame F1 and the frame F2.

Therefore, a transfer time interval T between the timing $t_{46}$ when the hub 3 finishes transferring the frame F1 and a timing $t_{50}$ when the hub 3 starts transferring the frame F2 is longer than the transmission time interval T0.

The synchronization master communication device 2 finishes transmitting the frame F2 at a timing $t_{48}$.

The hub 3 finishes transferring the frame C2 from the communication device 5 to the communication device 6 at a timing $t_{49}$.

The hub 3 starts transferring the frame F2 to the synchronization slave communication device 4 at the timing $t_{50}$.

The synchronization slave communication device 4 starts receiving the frame F2 from the hub 3 at a timing $t_{51}$.

Therefore, a reception time interval T between the timing $t_{47}$ when the synchronization slave communication device 4 finishes receiving the frame F1 and the timing when the synchronization slave communication device 4 starts receiving the frame F2 is longer than the transmission time interval T0.

The hub 3 finishes transferring the frame F2 to the synchronization slave communication device 4 at timing $t_{52}$.

The synchronization slave communication device 4 finishes receiving the frame F2 from the hub 3 at a timing $t_{53}$.

In the third timing example, the hub 3 is in the process of transferring the frame C1 from the communication device 5 to the communication device 6 at the timing $t_{40}$ at which the synchronization master communication device 2 starts transmitting the frame F1. As a result, a communication delay time Td between the timing $t_{40}$ and the timing $t_{44}$ at which the synchronization slave communication device 4 starts receiving the frame F1 is longer than the communication delay time Td in the first timing example illustrated in FIG. 9. Therefore, in the third timing example, the synchronization slave communication device 4 cannot perform timing synchronization with high accuracy.

Note that the reception time interval T can be accidentally equal to the transmission time interval T0 when the frame length of the frame C2 is very short.

However, the synchronization master communication device 2 transmits the frame F1 and the frame F2 at the transmission time interval T0 shorter than the time required for transmitting the minimum frame. Therefore, the reception time interval T is necessarily longer than the transmission time interval T0 even when the frame C2 is the minimum frame.

So, in the third timing example, the synchronization slave communication device 4 can determine that timing synchronization cannot be performed with high accuracy by determining that the reception time interval T between the timing $t_{47}$ and the timing $t_{51}$ is not equal to the transmission time interval T0 stored in the data field 55 of the frame F2. Accordingly, in the third timing example, the synchronization slave communication device 4 does not perform timing synchronization.

Note that although in the third timing example, description is given for the case where both the collision between the frame C1 and the frame F1 and the interruption by the frame C2 between the frame F1 and the frame F2 are caused, a similar description can be made for a case where only the interruption by the frame C2 between the frame F1 and the frame F2 is caused.

As described above, the communication system 1 according to the first embodiment performs timing synchronization only when timing synchronization can be performed with high accuracy as illustrated in the first timing example, but does not perform timing synchronization when timing synchronization cannot be performed with high accuracy as illustrated in the second and third timing examples.

The communication system 1 can thus improve the accuracy of timing synchronization.

Note that although the synchronization slave communication device 4 performs timing synchronization with the synchronization master communication device 2 in the aforementioned description, the hub 3 can perform timing synchronization with the synchronization master communication device 2 as well.

Figure 12:
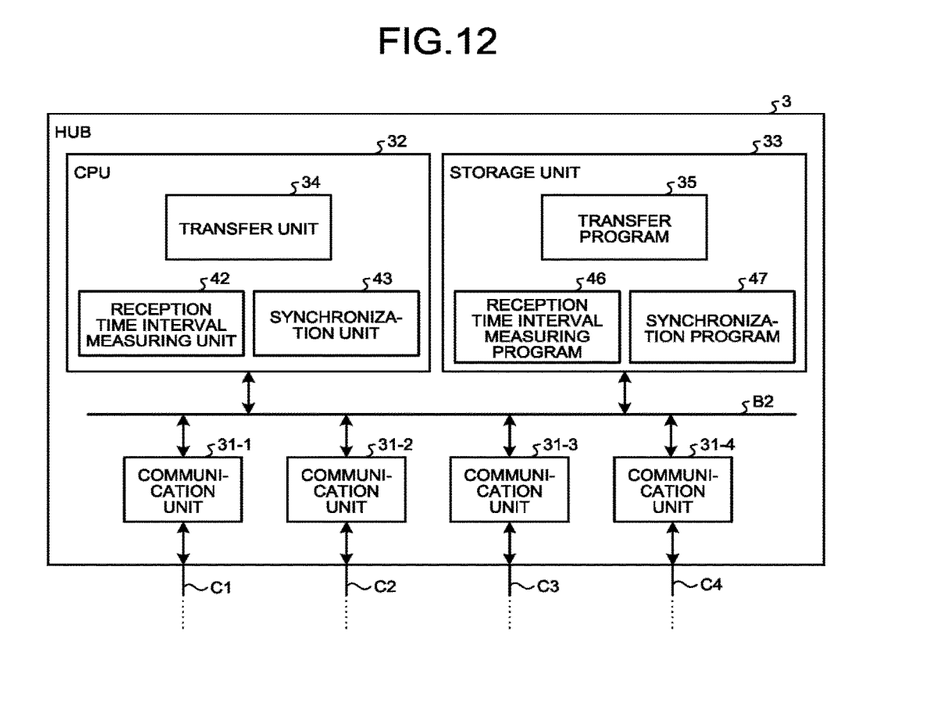
FIG. 12 is a diagram illustrating the hardware configuration of a hub of the communication system according to the first embodiment.

FIG. 12 is a diagram illustrating the hardware configuration of the hub of the communication system according to the first embodiment.

The hub 3 includes communication units 31-1, 31-2, 31-3, and 31-4, a CPU 32, and a storage unit 33. The communication units 31-1, 31-2, 31-3, and 31-4, the CPU 32, and the storage unit 33 are connected with each other via a bus 52.

Each of the communication units 31-1, 31-2, 31-3, and 31-4 is a physical layer circuit serving as a physical layer that is the first layer of the OSI reference model. The communication unit 31-1 is connected to the synchronization master communication device 2 via the cable C1. The communication unit 31-2 is connected to the synchronization slave communication device 4 via the cable C2. The communication unit 31-3 is connected to the communication device 5 via the cable C3. The communication unit 31-4 is connected to the communication device 6 via the cable C4.

The storage unit 33 stores a transfer program 35, the reception time interval measuring program 46, and the synchronization program 47. The storage unit 33 can be a flash memory (registered trademark), for example.

The transfer program 35 is a program for referring to a MAC address stored in a destination MAC address field of a frame received by the communication unit 31-1, 31-2, 31-3, or 31-4 and transferring the received frame to a destination communication device.

The CPU 32 executes the transfer program 35 to thereby implement a transfer unit 34 that transfers the frame received by the communication unit 31-1, 31-2, 31-3, or 31-4 to the destination communication device.

The CPU 32 executes the reception time interval measuring program 46 to thereby implement the reception time interval measuring unit 42 that measures the reception time interval between frames.

The CPU 32 executes the synchronization program 47 to thereby implement the synchronization unit 43 that performs timing synchronization with the synchronization master communication device 2 on the basis of the frames when the reception time interval is equal to the transmission time interval.

The hub 3 configured as described above can perform timing synchronization with the synchronization master communication device 2.

The configuration illustrated in the aforementioned embodiment illustrates an example of the content of the present invention, and can thus be combined with other publicly known techniques or partially omitted or modified without departing from the scope of the present invention.

REFERENCE SIGNS LIST 1 communication system; 2 synchronization master communication device; 3 hub; synchronization slave communication device; 5, 6 communication device; 21 frame generation unit; 22 transmission time interval measuring unit; 23 transmission unit; 24, 32, 44 CPU; 25, 33, 45 storage unit; 41 reception unit; 42 reception time interval measuring unit; 43 synchronization unit.

The invention claimed is:

1. A communication system in which communication is performed at a fixed communication rate, comprising:
   a first communication device to transmit a plurality of frames, each having a same minimum frame length, transmission of each of the plurality of frames beginning at a predetermined transmission time interval from completion of transmission of a preceding frame, the predetermined transmission time interval being shorter than a time required for transmitting a minimum-length frame having the minimum frame length; and
   a second communication device to perform timing synchronization with the first communication device on the basis of the plurality of frames when a reception time interval between successive frames of the plurality of frames received is equal to the predetermined transmission time interval,
   wherein the second communication device does not perform timing synchronization with the first communication device on the basis of the plurality of frames when the reception time interval of the frames received is not equal to the predetermined transmission time interval.

2. The communication system according to claim 1, wherein
the reception time interval is a time interval between a timing at which reception of one frame is completed and a timing at which reception of a subsequent frame is started.

3. The communication system according to claim 1, wherein the first communication device includes:
a frame generator to generate the plurality of frames;
a frame interval meter to measure the predetermined transmission time interval and store the predetermined transmission time interval into one of the frames; and
a transmitter to transmit the plurality of frames at the predetermined transmission time interval.

4. The communication system according to claim 1, wherein the second communication device includes:
a receiver to receive the plurality of frames;
a frame interval meter to measure the reception time interval; and
a synchronizer to perform timing synchronization with the first communication device on the basis of the plurality of frames when the reception time interval is equal to the predetermined transmission time interval.

5. The communication system according to claim 1, wherein each of the plurality of frames includes an identifier of the first communication device and an identifier of the second communication device.

6. The communication system according to claim 5, wherein the identifier of the first communication device is a media access control address of the first communication device, and the identifier of the second communication device is a media access control address of the second communication device.

7. The communication system according to claim 1, wherein the second communication device does not perform timing synchronization with the first communication device on the basis of the plurality of frames when the reception time interval of the frames received is not equal to the predetermined transmission time interval.

8. The communication system according to claim 1, wherein the minimum frame length is 64 bytes.

9. A communication device that communicates at a fixed communication rate, comprising:
a receiver to receive a plurality of frames, each having a same minimum frame length, from another communication device that transmits the plurality of frames, transmission of each of the plurality of frames beginning at a predetermined transmission time interval from completion of transmission of a preceding frame, the predetermined transmission time interval being shorter than a time required for transmitting a minimum-length frame having the minimum frame length; and
a processor to perform timing synchronization with the other communication device on the basis of the plurality of frames when a reception time interval between successive frames of the plurality of frames is equal to the predetermined transmission time interval,
wherein the processor does not perform timing synchronization with the other communication device on the basis of the plurality of frames when the reception time interval of the frames received is not equal to the predetermined transmission time interval.

10. A communication device that communicates at a fixed communication rate, comprising:
a transmitter that transmits a plurality of frames, each having a same minimum frame length, to another communication device, transmission of each of the plurality of frames beginning at a predetermined transmission time interval from completion of transmission of a preceding frame, the predetermined transmission time interval being shorter than a time required for transmitting a minimum-length frame having the minimum frame length, wherein
the other communication device receives the plurality of frames and performs timing synchronization with the communication device on the basis of the plurality of frames when a reception time interval between successive frames of the plurality of frames is equal to the predetermined transmission time interval, and
the other communication device does not perform timing synchronization with the communication device on the basis of the plurality of frames when the reception time interval of the frames received is not equal to the predetermined transmission time interval.

11. A communication method implemented by a communication system that includes a first communication device and a second communication device communicating with the first communication device at a fixed communication rate, the method comprising:
transmitting, by the first communication device, a plurality of frames, each having a same minimum frame length, transmission of each of the plurality of frames beginning at a predetermined transmission time interval shorter than a time required for transmitting a minimum-length frame having the minimum frame length relative to completion of transmission of a preceding frame;
determining, by the second communication device, whether a reception time interval between successive frames of the plurality of frames received is equal to the predetermined transmission time interval; and
performing, by the second communication device, timing synchronization with the first communication device on the basis of the plurality of frames when the reception time interval between successive frames of the plurality of frames received is equal to the predetermined transmission time interval, the timing synchronization not being performed by the second communication device in a case that the reception time interval between successive frames is not equal to the predetermined transmission time interval.

* * * * *